May 2, 1967  H. E. CLARK  3,317,317
XEROGRAPHIC METHOD OF MAKING A PARTICLE
TRANSPARENCY PROJECTIBLE IMAGE
Filed Jan. 2, 1963

INVENTOR.
HAROLD E. CLARK

BY Stanley B Cole

ATTORNEY

United States Patent Office 3,317,317
Patented May 2, 1967

3,317,317
XEROGRAPHIC METHOD OF MAKING A PARTICLE TRANSPARENCY PROJECTABLE IMAGE
Harold E. Clark, Penfield, N.Y., assignor to Xerox Corporation, Rochester, N.Y., a corporation of New York
Filed Jan. 2, 1963, Ser. No. 248,975
8 Claims. (Cl. 96—1.4)

This invention relates to xerography and more particularly to projectable negative transparency images and to images optically projectable as either positive or negative images.

It is an object of this invention to provide a transparency image which is viewable and projectable as either a positive or a negative. It is a further object to provide a method of making such a transparency image. It is a further object to provide a xerographic method of making a negative transparency image and the image itself. It is still a further object to provide a xerographic method of making a transparency image which may be optionally utilized as either a positive or a negative image.

These and further objects of the invention, which will become apparent from the following description, are achieved through the use of optically active image-forming material.

A conventional transparency image consists of a pattern of light-absorbing material, commonly black, positioned on a transparent support base. An image of this type is permanently determined in the sense that black areas remain black and white areas remain white. In the xerographic method of preparing transparency images, with which this invention is particularly concerned, an electrostatic latent image is first formed on a xerographic plate or other electric charge-retaining member, and this latent image produces a visible image by electrostatically controlling the deposition of suitable marking material. This marking material may be applied in image configuration to a transparent support member to form a transparency image thereon. Since the image-forming material is electrostatically distributed in image configuration without having to undergo any chemical reaction, a wide choice of material may be employed. It should be noted, however, that the consistent achievement of high quality images by this method requires the use of materials with very carefully controlled physical and electrical properties. Due to inherent properties of the xerographic process, transparency images are generally of the positive type, i.e., black lines on white background. Inherent properties of the process have heretofore made it relatively difficult to form negative images, i.e., white lines on a black background. In accordance with the present invention, however, this problem is overcome and negative images are formed which are in many cases usable as positive images also.

Figure 1A:
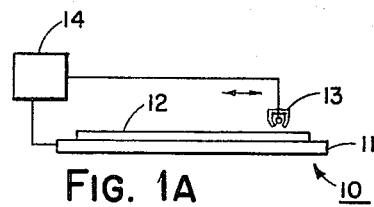
Figure 1B:
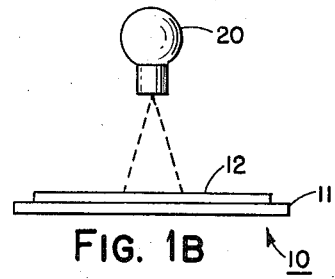
Figure 1C:
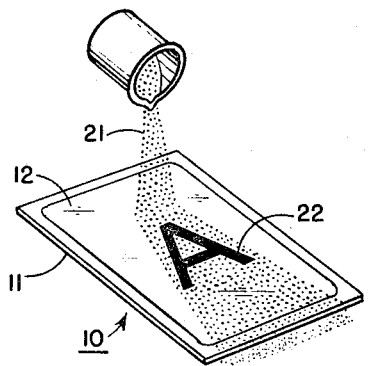
Figure 1D:
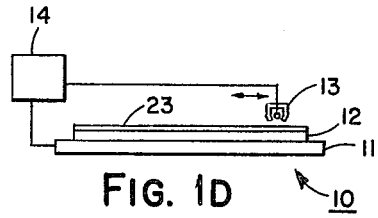
Figure 1E:
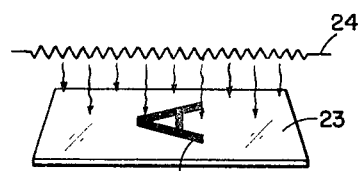
Figure 2:
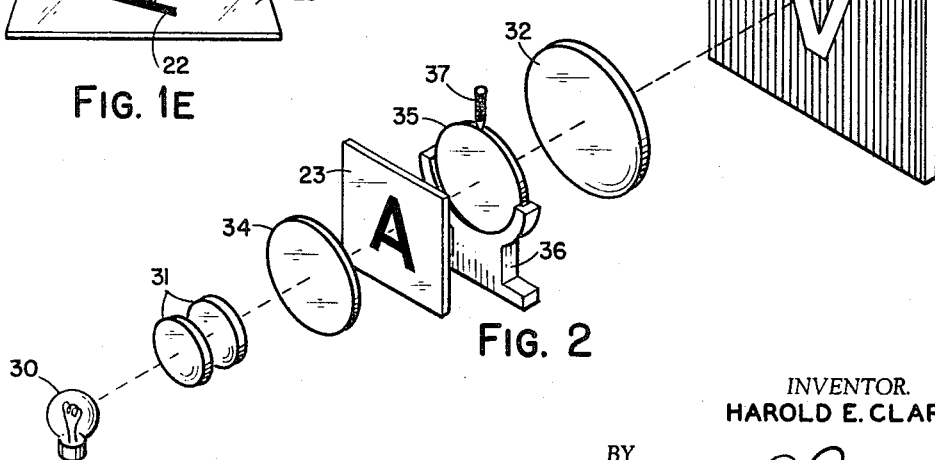

The invention will be illustrated with the help of the drawing in which FIGURE 1 shows xerographic processing steps and FIGURE 2 shows the image and apparatus of the invention.

Since xerography, as disclosed in U.S. Patent No. 2,297,691 and many subsequent patents and publications, is by now well known, no attempt will be made to describe conventional xerographic procedures in great detail. FIGURE 1-A illustrates the charging of the xerographic plate, which is normally the first step in preparing a xerographic image. A xerographic plate 10 comprises a mechanical support layer 11 upon which is coated a thin layer of photoconductive insulator 12 which may comprise vitreous selenium, other homogenous photoconductive insulators, including organic photoconductors, or dispersions of zinc oxide or other photoconductive materials in electrically insulating film-forming binder materials.

A corona charging unit 13 energized by a high voltage power supply 14, applies an electric charge on the order of several hundred volts to xerographic plate 10. Either a positive or a negative polarity may be employed, depending upon the nature of the particular xerographic plate. Illustratively, a positive polarity is generally used with selenium xerographic plates whereas a negative polarity is generally used with zinc oxide plates. FIGURE 1-B shows the xerographic plate being exposed to a pattern of light and shadow by a projector 20. The plate may also be exposed in a camera, contact printer, or the like. This step selectively dissipates the charge from plate 10 in illuminated areas, leaving an electrostatic latent charge pattern on the plate. FIGURE 1-C illustrates development of the electrostatic latent image by pouring over the plate a powder developer composition 21. This developer composition includes finely divided electrostatically attractable marking particles. The developer composition may also desirably contain, as taught in U.S. Patent 2,638,416, larger particles in addition to the smaller marking particles. The marking particles adhere to the xerographic plate in charged areas, thus forming an image pattern 22 on the plate.

Many procedures are now known for developing an image on a xerographic plate in addition to the one illustrated in this figure and may also be used in the present invention. Thus, the image-forming material may be mixed with larger particles as described, may be used alone, may be suspended in a liquid or gaseous medium or supported on a sheet-like member or may even be in liquid form. FIGURE 1-D illustrates the transfer of the developed image from xerographic plate 1 to a transparent support 23. Support 23 is optically inactive or, if active, is uniform in thickness and composition so that it can transmit polarized light without loss or distortion of polarization. The transparent support, which is normally electrically insulating, is placed in face to face relationship with xerographic plate 10 and corona charging unit 13 is again used to deposit an electric charge on the back of support member 23. Electrostatic fields produced by these charges cause the image pattern 22 to transfer from xerographic plate 10 to transparent support member 23. There is thus formed on the transparent support member a pattern of image-forming material which corresponds to the pattern of light and shadow applied to the xerographic plate in FIGURE 1-B.

The xerographic process embodies known variations whereby an image pattern may be produced on a transparent support member without the separate steps of first developing the image on a xerographic plate and then transferring it therefrom. Thus, the image may be developed on a transparent xerographic plate and allowed to remain there. Such plates may be formed by using a transparent support member 11 and by using a transparent photoconductive insulator for element 12. Such photoconductive insulators can be prepared from organic photoconductors and the materials described in Canadian Patent 568,707 are particularly useful. Images can also be xerographically formed on a transparent sheet by placing the sheet over the xerographic plate after the step of FIGURE 1-B and then carrying out the step of FIGURE 1-C, with the transparent film on the xerographic plate 10. It is also possible to transfer the electrostatic latent image from plate 10 to transparent support member 23 and then develop the latent image on transparent support member 23 rather than on xerographic plate 10. Various other expedients are known in the xerographic art and may likewise be employed.

As a final, although not essential step of the process, the image is permanently fixed to transparent support member 23, as shown in FIGURE 1-E. In this figure, a heating element 24 is shown heating transparent support member 23 to cause the image pattern 22 to adhere thereto. The image-forming material, as will be described, is often thermoplastic and may be softened and fused by heat, thereby becoming firmly attached to transparent support 23. This will also cause the individual particles of the image to join together, which is sometimes desirable in terms of the present invention. Since these particles are also soluble in appropriate solvents, in most instances, they can also be fixed through the use of solvent vapors. Trichlorethylene is a suitable solvent which is relatively nonflammable and nontoxic and softens a wide range of plastic materials, but various other solvents can also be used, depending on the solubility characteristics of the particular image-forming material. Where the image-forming materials are not themselves softenable, they can be fixed by softening the transparent support film, by the application of a transparent lacquer, or by other means.

In accordance with the present invention, the image-forming material should be light transmitting. It may be clear or it may be tinted, but it should not be opaque. The material should preferably be optically active—that is, it should rotate the plane of polarization of polarized light which passes through it. In a further embodiment, the material may be an optically inactive material—that is sufficiently light scattering so as to destroy the polarization of incident light.

FIGURE 2 illustrates a form of apparatus suitable for use in the invention. Element 23 is the same transparent image-bearing support film shown and described in FIGURE 1. A lamp 30 projects light through the condenser 31 and through transparent member 23 and this light is then intercepted by a projection lens 32 and focused onto a screen 33 which may be opaque or translucent as desired. Positioned on either side of transparent support 23 and substantially close and parallel thereto are polarizers 34 and 35. At least one of the polarizers may be supported in a guide 36 and provided with a handle 37 whereby it may be rotated about an axis parallel to the optical axis of the system. If transparent support member 23 is very small, polarizers 34 and 35 may comprise Nicols prisms but it will generally be more practical and economical to employ synthetic sheet type polarizing films such as those available from the Polaroid Corporation and sold under the name Polaroid. If the polarizers 34 and 35 are so positioned that polarizer 35 is perpendicular to the plane of polarization of light emerging from transparent member 23, then substantially no light will pass through the system and screen 33 will be dark. If transparent support member 23 is not optically active, then polarizers 34 and 35 will be positioned so that their planes of polarization are mutually perpendicular.

Where, however, optically active image forming material is present on transparent support member 23 the plane of polarization of light incident on member 23 will be rotated, and such light will be able to pass through polarizer 35 and to screen 33. There will thus be formed on the screen a bright image corresponding to the image-forming material, whereas other non-image areas will remain black. If handle 37 is used to rotate polarizer 36 by 90°, then light from non-image areas will freely pass through the system and produce bright areas on screen 33. In image areas, however, the plane of polarization of the light will be rotated and at least part of the light will be blocked by polarizer 35 and prevented from reaching screen 33 which will thus remain dark in image areas. Accordingly, through operation of handle 37, it is possible to optionally choose between a positive black on white image or a negative white on black image without in any way altering the image-bearing transparent support member 23. The same results, of course, can be achieved without the optical projection system by simply looking at the transparency image through polarizers 34 and 35.

Light scattering materials which are not optically active may also be employed. Thus, image development may be carried out with finely divided unpigmented resin particles which are not necessarily optically active and which are not completely fused during the fixing step. Such particle image is light scattering and will depolarize polarized light. It will, therefore, appear light against a black background when placed between crossed polarizers.

In exemplification of the invention a latent charge pattern was formed on a xerographic plate and developed with micro sized particles of Amberol F–71, a resin modified phenol formaldehyde resin available from Rohm and Haas. The developed image was then transferred and fixed to a thin sheet of glass. The glass was placed between polarizers in a projection system and the polarizers were adjusted for minimum transmission in background areas. The image areas then appeared as a bright projected image against a black background.

Various optically active solids are known and may be adapted for use in the invention. Cyclohelisene is particularly useful and various terpene compounds also exhibit notable optical activity.

There is thus provided in the xerographic art a novel form of xerographic image as well as means and methods for optionally producing either a positive or a negative image therefrom. The invention having been described in terms of illustrative embodiments, there is no intention to disclaim the various modifications which will be immediately obvious to one skilled in the art, except as the invention is limited by the following claims.

What is claimed is:

1. The xerographic method of making a particle transparency projectable image wherein the particle image areas appear light against a dark background comprising:
    (a) forming an electrostatic latent image corresponding to an original pattern of light and shadow;
    (b) forming on a uniform transparent support member in conformity with the electrostatic latent image a pattern of electrostatically attractable transparent particles capable of altering polarized light;
    (c) placing the support member between light polarizing elements;
    (d) shining light through said support member and light polarizing elements; and,
    (e) adjusting said polarizers for minimum transmission of said light through areas of said support free of said particles.

2. The method of claim 1 in which the particles comprise light scattering material to depolarize incident polarized light.

3. The method of claim 1 in which the particles comprise optically active material to rotate the plane of polarization of incident polarized light.

4. The method of claim 1 in which the particles comprise rosin modified phenol formaldehyde and the transparent support member comprises glass.

5. The xerographic method of making a particle transparency projectable image wherein the particle image areas appear light against a dark background comprising:
    (a) uniformly electrostatically charging a xerographic plate;
    (b) exposing the plate to a pattern of light and shadow to form an electrostatic latent image corresponding to the pattern;
    (c) developing the latent image on the plate with electrostatically attractable particles capable of altering polarized light;
    (d) electrostatically transferring the particulate material in image configuration onto a uniform transparent support;
    (e) placing the support member between light polarizing elements;

(f) shining light through said support member and light polarizing elements; and, (g) adjusting said polarizers for minimum transmission of said light through area of said support free of said particles.

6. The method of claim 5 in which the particles comprise light scattering material to depolarize incident polarized light.

7. The method of claim 5 in which the particles comprise optically active material to rotate the plane of polarization of incident polarized light.

8. The method of claim 5 in which the particles comprise rosin modified phenol formaldehyde and the transparent support member comprises glass.

References Cited by the Examiner

UNITED STATES PATENTS

| | | | |
|---|---|---|---|
| 2,269,713 | 1/1942 | Erwin | 88—23 |
| 2,440,106 | 4/1948 | Land et al. | 88—65 |
| 2,457,799 | 1/1949 | Altenberg | 88—65 |
| 2,458,168 | 1/1949 | Husek | 88—65 |
| 2,882,631 | 4/1959 | Boone | 40—130 |
| 2,947,212 | 8/1960 | Woods | 88—14 |
| 3,015,693 | 1/1962 | Volberg et al. | 88—65 |
| 3,051,041 | 8/1962 | Lehmann et al. | 96—1 X |
| 3,059,538 | 10/1962 | Sherwood et al. | 88—61 |
| 3,079,508 | 2/1963 | Rabinovici | 88—14 |
| 3,083,623 | 4/1963 | Mott | 96—1 |

FOREIGN PATENTS

| | | |
|---|---|---|
| 203,907 | 11/1956 | Australia. |
| 918,538 | 9/1954 | Germany. |
| 723,534 | 2/1955 | Great Britain. |
| 762,190 | 11/1956 | Great Britain. |

NORMAN G. TORCHIN, *Primary Examiner.*

A. LIBERMAN, C. E. VAN HORN, *Assistant Examiners.*